H. FORD.
AUTOMOBILE CONSTRUCTION.
APPLICATION FILED JULY 21, 1909.
1,075,557.
Patented Oct. 14, 1913.
2 SHEETS—SHEET 1.
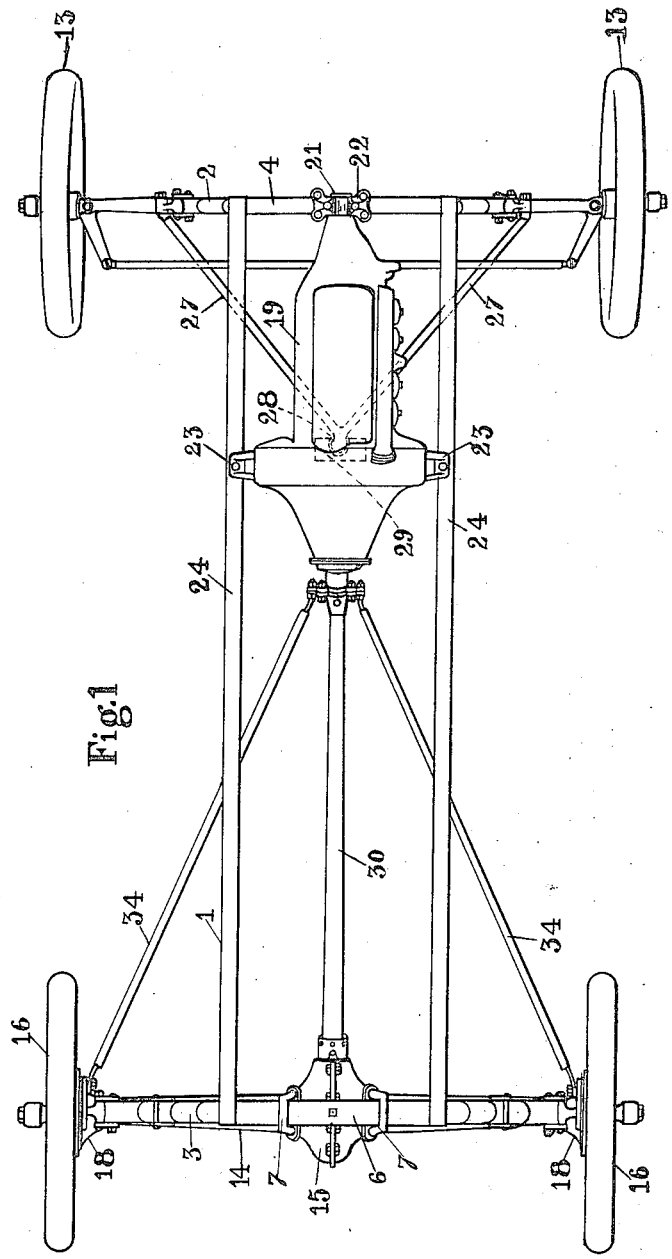
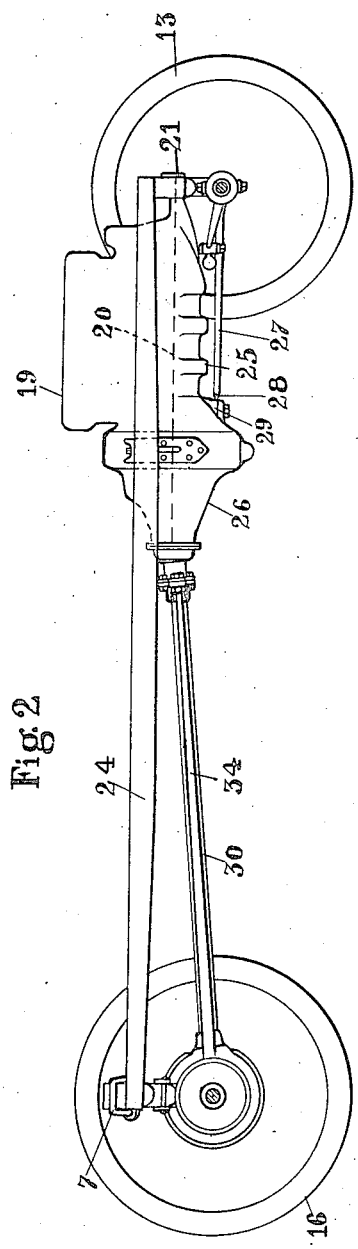
Witnesses
A. M. Shannon.
A. M. Dorr.
Inventor
HENRY FORD
By Bartlett & Bartlett
Attorneys

H. FORD.
AUTOMOBILE CONSTRUCTION.
APPLICATION FILED JULY 21, 1909.

1,075,557.

Patented Oct. 14, 1913.

2 SHEETS—SHEET 2.

Witnesses
C. M. Shannon.
A. M. Dorr.

Inventor
HENRY FORD
By
Attorneys

UNITED STATES PATENT OFFICE.

HENRY FORD, OF DETROIT, MICHIGAN.

AUTOMOBILE CONSTRUCTION.

1,075,557.  Specification of Letters Patent.  Patented Oct. 14, 1913.

Application filed July 21, 1909. Serial No. 508,779.

*To all whom it may concern:*

Be it known that I, HENRY FORD, a citizen of the United States of America, residing at Detroit, in the county of Wayne and State of Michigan, have invented certain new and useful Improvements in Automobile Construction, of which the following is a specification, reference being had therein to the accompanying drawings.

In the construction of automobiles, it is desirable that the torque of the engine be transmitted to the traction wheels in as direct a line and with as little side thrust upon the vehicle frame as possible. The load on the vehicle should likewise be so distributed as to permit the frame and the wheels to accommodate themselves to any inequalities of the road without racking the frame or running gear or binding the driving mechanism, and the running shocks from the driving and steering wheels should likewise be centralized in the frame in line with the load and driving strains.

This invention relates to automobile construction and more particularly to an arrangement of the driving mechanism and the support of the chassis adapted to transmit both the load and driving strains in the same direct line and to afford flexibility together with lightness and simplicity of design.

The invention consists in the matters hereinafter set forth and more particularly pointed out in the appended claims.

Figure 3:
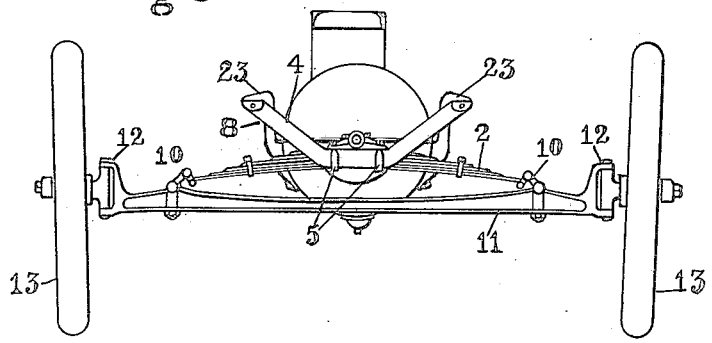
Figure 4:
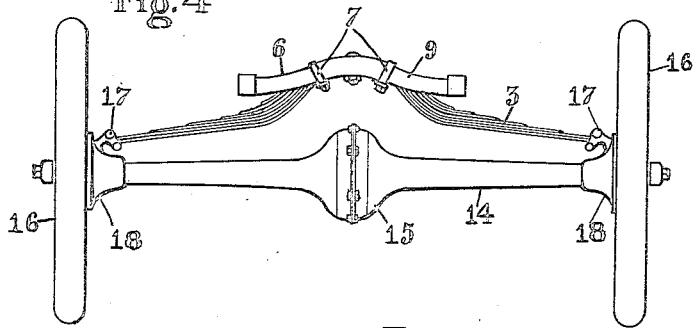
Figure 5:
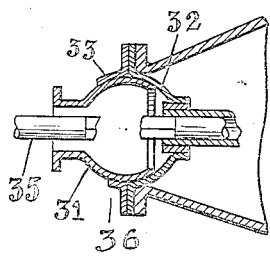
Figure 6:
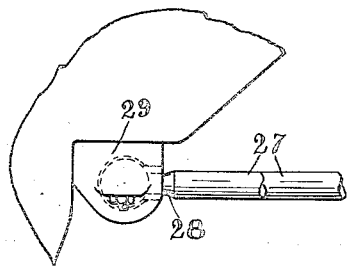

Referring to the drawings, Figure 1 is a plan view of the chassis and driving mechanism of an automobile embodying features of the invention; Fig. 2 is a side view thereof; Fig. 3 is a view in front elevation of the chassis; Fig. 4 is a view of the rear end of the chassis; Fig. 5 is a view in detail of a driving thrust bearing; and Fig. 6 is a view in detail of a front axle thrust bearing.

In the drawings a substantially rectangular frame 1 of suitable design is centrally supported at its forward end on a spring 2, and at its rear end on a spring 3, a forward cross member 4 of the main frame being preferably rigidly secured to the crown of the spring by suitable clips 5, and a rear cross member 6 of the frame being likewise secured to the spring 3 by clips 7. As a preferred detail of construction, the members 4 and 6 of the frame are channel irons whose depending flanges 8 and 9 bear against the margins of the spring leaves and prevent lateral tilting, the channel irons being crowned slightly or bent between their ends to conform to the crowns of the springs and thereby make a comparatively long bearing surface or spring seat. The forward spring 2 is hung at its ends in shackles 10 or like suitable supporting means on a front axle 11 having steering knuckles 12 on which forward bearing wheels 13 are mounted. The knuckles have the usual link or like member connecting them, and a steering mechanism of any preferred type, not herein shown, may be mounted on the frame. The rear axle 14 which is preferably tubular and has an enlarged central portion 15 acts as a housing for a differential transmission, of any preferred type, not indicated, traction wheels 16 actuated by the differential gear being rotatably secured at the outer ends of the tubular axle 14 in the usual manner. The rear spring 3 is suitably supported at its extremities in shackles 17 or the like, pivoted to collars or flanges 18 on the rear axle adjacent the wheel hubs thereof, so that any load on the spring is transmitted almost directly to the wheels and has no effect upon the rear axle 14.

A motor 19 of any preferred type is placed on the forward end of the frame with its main shaft in substantially axial alinement with the centers of support of the frame ends, the shaft, whose axis is indicated by the dotted line 20, being concentric with a stud 21 on the forward end of the motor casing that is journaled in a suitable bearing 22 on the forward member 4 of the frame centrally above the spring support of the latter. The body of the motor is carried by a pair of oppositely disposed hangers or brackets 23 each rigidly secured to side members 24 of the frame 1.

The crank case 25 of the motor from which the stud 21 extends and to which the hangers 23 are attached, together with a housing 26 for a change speed mechanism, or, in other words, a transmission casing, are preferably arranged to be substantially continuous or to constitute a one-piece member adapted to withstand endwise strains and stresses.

A pair of converging radius rods or struts 27 connected at their outer ends to the front axle near the steering knuckles are united at their other ends in a yoke 28 having a spherical end journaled in a thrust bearing 29 of suitable design secured on the crank case 25 of the motor. This forms a ball-and-socket joint acting as a thrust bearing for the front axle in the vertical plane of the centers of the spring supports of the main frame.

A hollow arm 30 is rigidly secured at its rear end to or is substantially integral with the center portion of the rear hollow axle 14, and extends forward therefrom to the transmission casing 26. The forward end of the arm, strut or reach 30 is arranged to form a universal joint with the transmission casing, as, for example, by having a hollow spheroidal end 31 bearing against a correspondingly concave cup 32 secured in the end of the transmission casing in axial alinement with the motor shaft, a retaining ring 33 of suitable design preventing the withdrawal of the reach. Radius rods 34 are secured at their rear ends to the collars 18 on the rear axle and are connected at their forward ends to the reach 30 close to the universal joint connection with the transmission casing, the converging axes of the rods preferably passing through the center of oscillation of the joint.

In the preferred form of construction, the transmission casing 26, and the crank case 25, as well as the tubular rear axle 14 and the reach 30, are of pressed steel or the like.

The differential mechanism, driving the rear wheels, is coupled to the motor through any preferred type of transmission mounted in the casing 26 and a transmission shaft 35 journaled in the reach 30 and having a universal joint 36 whose center of oscillation is substantially coincident with the center of oscillation of the universal thrust bearing connection between the reach 30 and casing 26.

As herein indicated, the main frame 1 has no diagonal braces, and in light cars, the latter may be omitted as the three point connection of the motor with the end and side members of the frame makes the motor a brace adapted to resist any tendency of the latter to rack. As a result of this method of construction, any load upon the main frame is carried to the central alined points of support on the springs. The forward spring transmits this load to the forward axle near the ends of the latter, so that the axle itself may have a very light center section. The rear spring is supported at its ends in such manner that any weight thereon is conveyed almost directly to the journals and hubs of the traction wheels, so that the rear axle has practically nothing to support, except the differential and transmission shaft. Thus the load on the vehicle is substantially concentrated in a central vertical plane in which the longitudinal axis of the vehicle lies.

The thrust of the driving wheels is carried directly to the center line of the frame by the radius rods and reach, the latter acting likewise as a torsion rod. Rocking of the rear axle under the frame or of the frame on the rear axle has no effect upon the driving mechanism which in all instances conveys the driving strain directly to the center line of the frame. The radius rods of the forward axle likewise bring the shocks from the forward wheels directly to the motor casing and the center line of the machine, so that both the weight of the load and the driving load, the one vertical and the other substantially horizontal in effect, are distributed in the central vertical plane of the chassis and do not in any way tend to rack the frame or bind the transmission mechanism. This concentration of the loads allows a very light construction, and greatly increases the efficiency and life of the transmission itself, and reduces tire wear and fuel consumption.

The arrangement of the springs herein indicated is preferable, but any disposition thereof which concentrates the load at the same points and permits the oscillations of the several members may be substituted.

Obviously changes in the details of construction may be made without departing from the spirit of the invention and I do not limit myself to any particular form or arrangement of parts.

What I claim as my invention is:—

1. In an automobile, front and rear axles, a frame, springs each articulated at the ends to one of the axles and rigidly secured to the frame between the said ends, and struts whose outer ends are secured to the axles near the ends thereof and whose inner ends are pivotally connected to the frame in substantially the vertical plane of the points of attachment of the springs thereto.

2. In an automobile, a front axle, a rear axle, a frame having transverse members, springs each rigidly secured to the medial portion of a transverse member and articulated at both ends to an axle near the extremities thereof, and struts from the outer portions of the axles secured at their inner ends by a pivotal connection to the frame in substantially the vertical plane of the spring connection thereto.

3. In an automobile, a front axle, a rear axle, a frame, transverse members therein above each axle, springs each articulated at its ends to the end portions of an axle and rigidly secured at its middle to the central portion of an adjacent transverse member, and struts each secured at one end to the outer portion of an axle and at the other attached to the frame by a pivotal connection in substantially the vertical plane passing through the points of attachment of the springs to the frame.

4. In an automobile, a front axle, a rear axle, a frame, a transverse member therein over each axle, a spring between each axle and adjacent transverse member articulated at its ends to the axle and rigidly secured at its middle to the adjacent member, and struts whose outer ends are each secured to the outer portion of an axle and whose inner ends are secured to the frame by pivotal connections at points in substantial alinement with the spring connections of the frame.

5. In an automobile, a front axle, a rear axle, a frame thereover, a spring over each axle articulated at its ends to the end portions thereof, a transverse member on the frame over each axle bent between its ends to form a spring seat rigidly secured to the spring, and rigid struts between the axle ends and points in the frame that lie in the vertical plane of the points of attachment of the spring seats to the frame.

6. In an automobile, a front axle, a rear axle, a frame having a transverse member over each axle connected by longitudinal members, a spring between each axle and adjacent transverse member secured at its ends to the axle and at its middle to the middle portion of the adjacent member, a motor having one end journaled on one transverse member in substantial coincidence with its point of attachment to the adjacent axle spring, and secured at each side to a longitudinal frame member, and struts each connected at one end to an axle and at the other to the motor in the vertical plane of the spring and motor connections to the transverse members.

7. In an automobile, a front axle, a rear axle, a frame having transverse members each over an axle connected by longitudinal members, a spring between each axle and an adjacent member secured at its ends to the axle and at its middle to the middle portion of the adjacent member, a motor having one end journaled on one transverse member at substantially its point of attachment to the adjacent spring, and having the other end secured rigidly to the frame, and struts each pivoted at one end to the motor at a point in the plane of attachment of the springs and motor to the transverse members of the frame and secured at the other to an axle.

8. In an automobile, a front axle, a rear axle, traction wheels on the rear axle, a frame, springs each centrally secured to the middle of a transverse member of the frame and at its ends to an axle, a motor journaled at one end on the frame substantially in coincidence with the point of attachment of the latter to a spring and rigidly secured at the other end to the longitudinal members of the frame, a transmission shaft drive between the motor and traction wheels, a crank-case on the motor, a hollow strut from the rear axle forming therewith a housing for the transmission shaft drive and bearing at its other end against the motor case, and other struts from the axles pivoted to the casing, all in the plane of the spring and motor attachments to the transverse members of the frame.

9. In an automobile, a front axle, a rear axle, a frame having transverse members over each axle connected by longitudinal members, springs each secured at its ends to an axle and at its center to the middle portion of a transverse member, a motor with its main shaft arranged longitudinally of the frame and with its forward end journaled on a transverse member concentrically with the main shaft and in substantial coincidence with the point of attachment of the spring, the rear end being rigidly secured on each side to a longitudinal member of the frame, a hollow strut rigidly secured at its rear end to one of the axles and pivoted at its forward end to the motor in the plane of the spring attachment and main shaft, struts secured to the forward axle and pivoted to the motor in said plane, traction wheels on the rear axle, and transmission mechanism between the traction wheels and motor housed in the rear axle and hollow strut.

10. In an automobile, a front axle, a rear axle, traction wheels thereon, a frame consisting of a transverse member over the forward axle, a transverse member over the rear axle, and longitudinal side members connecting the ends of the transverse members, springs each secured at the ends to an axle and at its center to the middle portion of a transverse member, a motor pivoted at its forward end to the forward transverse member in substantial coincidence with the point of attachment of the spring, and secured at its rear end rigidly to each longitudinal member, the main shaft of the motor being in axial alinement with the pivot bearing, a hollow strut secured at its rear end to the rear axle and pivoted at its forward end to the motor in axial alinement with the forward pivot bearing, transmission mechanism between the traction wheels and motor housed in the hollow strut and rear axle, and struts whose outer ends are secured to the front axle and whose inner ends are pivoted to the motor in substantial alinement with the forward motor pivot bearing and hollow strut pivot joint.

11. In an automobile, a front axle, a rear axle, traction wheels thereon, a frame consisting of a transverse member over the forward axle, a transverse member over the rear axle and longitudinal side members connecting the ends of the transverse members, springs each secured at its ends to an axle and at the center to the middle portion of the adjacent transverse member, a motor crank and transmission casing whose forward end is journaled on a transverse member at substantially the point of attachment of the spring and whose rear end is rigidly secured at each side to a longitudinal frame-member, a hollow strut whose rear end is rigidly secured to the rear axle and whose forward end has a ball-and-socket connection with the rear end of the casing in substantially axial alinement with the forward pivot bearing, radius rods whose outer ends are secured to the rear axle near its extremities and whose forward convergent ends are secured to the strut near the ball-and-socket connection with the casing, radius rods whose outer ends are secured to the outer ends of the front axle and whose convergent rear ends are united and connected to the casing with a ball-and-socket joint in substantial alinement with the forward casing bearing and the rear strut ball-and-socket joint, transmission mechanism for the traction wheels housed in the rear axle, its strut and the casing, and a motor on the casing with its main shaft concentric with the forward bearing of the casing, coupled to the transmission mechanism.

12. In an automobile, a front axle, a rear axle, springs each suspended at the ends on the outer portions of the axles, a frame to the transverse members of which middle portions of the springs are severally secured, a power plant pivotally secured at its forward end to a forward transverse member of the frame and rigidly secured at their sides to a side member of the frame at one point, converging forward struts whose outer ends are pivotally attached to the outer portions of the front axle and whose meeting rear ends are pivotally secured to the power plant, and rear struts whose divergent ends are pivotally secured to the outer portions of the rear axle and whose forward convergent ends have a single pivotal connection with the power plant, the points of attachment of the struts to the power plant and of the springs to the frame lying in substantially the vertical medial plane of the frame.

In testimony whereof I affix my signature in presence of two witnesses.

HENRY FORD.

Witnesses:
 ANNA M. DORR,
 C. R. STICKNEY.